(12) United States Patent
Phuyal et al.

(10) Patent No.: US 10,973,078 B2
(45) Date of Patent: Apr. 6, 2021

(54) SUPPORTING SEMI-PERSISTENT SCHEDULING FOR VARIED TRANSMISSION TIME INTERVALS

(71) Applicant: Apple Inc., Cupertino, CA (US)

(72) Inventors: Umesh Phuyal, Beaverton, OR (US); Youn Hyoung Heo, Seoul (KR); Yujian Zhang, Beijing (CN); Mo-Han Fong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/754,476

(22) PCT Filed: Jun. 24, 2016

(86) PCT No.: PCT/US2016/039244
§ 371 (c)(1),
(2) Date: Feb. 22, 2018

(87) PCT Pub. No.: WO2017/052706
PCT Pub. Date: Mar. 30, 2017

(65) Prior Publication Data
US 2018/0242389 A1    Aug. 23, 2018

Related U.S. Application Data

(60) Provisional application No. 62/294,866, filed on Feb. 12, 2016, provisional application No. 62/233,154, filed on Sep. 25, 2015.

(51) Int. Cl.
*H04W 4/00* (2018.01)
*H04W 76/28* (2018.01)
(Continued)

(52) U.S. Cl.
CPC .......... *H04W 76/28* (2018.02); *H04L 1/1812* (2013.01); *H04W 72/042* (2013.01);
(Continued)

(58) Field of Classification Search
USPC .................................................. 370/280, 329
See application file for complete search history.

(56) References Cited

U.S. PATENT DOCUMENTS

2010/0291925 A1* 11/2010 Nagata ................. H04J 11/0069
455/434
2014/0241262 A1    8/2014 Novak et al.
(Continued)

FOREIGN PATENT DOCUMENTS

| CN | 103796311 A | 5/2014 |
|---|---|---|
| CN | 104378185 A | 2/2015 |

(Continued)

OTHER PUBLICATIONS

"DL and UL SPS Reconfiguration." 3GPP TSG-RAN WG2 Meeting #77, Dresden, Germany, Feb. 6-10, 2012. R2-120364. 6 pages.
(Continued)

*Primary Examiner* — Phuongchau Ba Nguyen
(74) *Attorney, Agent, or Firm* — Eschweiler & Potashnik, LLC

(57) ABSTRACT

An apparatus configured to be employed within an evolved Node B (eNodeB) or within a User Equipment (UE) is disclosed. The apparatus includes control circuitry. The control circuitry is configured to configure a semi-persistent scheduling (SPS) configuration that accommodates short subframes. The short subframes have a transmit time interval (TTI) of less than duration of 1 legacy subframe (e.g., 1 ms). The SPS configuration is provided within a radio resource control (RRC) signaling.

29 Claims, 9 Drawing Sheets

(51) Int. Cl.
*H04W 72/04* (2009.01)
*H04W 76/27* (2018.01)
*H04L 1/18* (2006.01)
*H04W 72/12* (2009.01)
*H04W 76/30* (2018.01)

(52) U.S. Cl.
CPC ....... *H04W 72/1215* (2013.01); *H04W 76/27* (2018.02); *H04W 76/30* (2018.02)

(56) References Cited

U.S. PATENT DOCUMENTS

| 2015/0131564 | A1  | 5/2015  | Seo et al.              |
|--------------|-----|---------|-------------------------|
| 2015/0195070 | A1  | 7/2015  | Kim et al.              |
| 2015/0195072 | A1* | 7/2015  | Seo ............... H04L 1/1614 370/329 |
| 2015/0271798 | A1  | 9/2015  | Chen et al.             |
| 2017/0318564 | A1* | 11/2017 | Lee ............... H04L 5/001 |
| 2018/0103504 | A1* | 4/2018  | Quan ............. H04W 52/02 |
| 2019/0116559 | A1* | 4/2019  | Takeda ........... H04W 52/146 |

FOREIGN PATENT DOCUMENTS

| EP | 2637343 A2    | 9/2013  |
|----|---------------|---------|
| WO | 2013169173 A1 | 11/2013 |
| WO | 2013177764 A1 | 12/2013 |

OTHER PUBLICATIONS

"Areas for latency reduction." 3GPP TSG-RAN WG2 #91. Beijing, P.R. China, Aug. 24-28, 2015. Tdoc R2-153489. 7 pages.
International Search Report dated Sep. 9, 2016 for International Application PCT/US2016/039244.
"New SI: Study on Latency reduction techniques for LTE." 3GPP TSG RAN Meeting #67. Shanghai, China, Mar. 9-12, 2015. RP-150465 revision of RP-150309. 8 pages.
3rd Generation Partnership Project: Technical Specification Group Radio Access Network; Evolved Universal Terrestrial Radio Access (E-UTRA); Medium Access Control (MAC) protocol specification (Release12). 3GPP TS 36.321 V12.7.0 (Sep. 2015). 77 pages.
3rd Generation Partnership Project: Technical Specification Group Radio Access Network; Evolved Universal Terrestrial Radio Access (E-UTRA); Medium Access Control (MAC) protocol specification (Release12). 3GPP TS 36.321 V12.7,0 (Sep. 2015). 453 pages.
Ericsson, "Study of shorter TTI for Latency Reduction", R2-153493, 3GPP TSG-RAN WG2 91, Beijing, China, Aug. 24-28, 2015, p. 1-5.

* cited by examiner

| SPS-ConfigDL | |
|---|---|
| semiPersistSchedIntervalDL | ssf10, ssf20, ssf32, ssf40, ssf64, ssf80, ssf128, ssf160 |

| SPS-ConfigUL | |
|---|---|
| semiPersistSchedIntervalUL | ssf1, ssf2, ssf5, ssf10, ssf20, ssf32, ssf40, ssf64, ssf80, ssf128, ssf160, ssf320, ssf640 |
| implicitReleaseAfter | e2, e3, e4, e8 |

| SPS-ConfigDL | |
|---|---|
| semiPersistSchedIntervalDL | sf10, sf20, sf32, sf40, sf64, sf80, sf128, sf160 |
| semiPersistSchedIntervalDLsTTI | ssf1, ssf2, ssf5 |

| SPS-ConfigUL | |
|---|---|
| semiPersistSchedIntervalUL | sf1, sf2, sf5, sf10, sf20, sf32, sf40, sf64, sf80, sf128, sf160, sf320, sf640 |
| semiPersistSchedIntervalULsTTI | ssf1, ssf2, ssf5, ssf10, ssf20, ssf32, ssf40, ssf64, ssf80, ssf128, ssf160, ssf320, ssf640 |
| implicitReleaseAfter | e2, e3, e4, e8 |

SUPPORTING SEMI-PERSISTENT SCHEDULING FOR VARIED TRANSMISSION TIME INTERVALS

REFERENCE TO RELATED APPLICATION

This application is a National Phase entry application of International Patent Application No. PCT/US2016/039244 filed Jun. 24, 2016, which claims priority to U.S. Provisional Application 62/294,866 filed on Feb. 12, 2016 and U.S. Provisional Application 62/233,154 filed Sep. 25, 2015 in the name of Umesh Phuyal et al. and is hereby incorporated by reference in its entirety.

FIELD

The present disclosure relates to mobile communication, and more particularly, semi-persistent scheduling for various transmission time intervals.

BACKGROUND

Mobile communications, including cellular communications, involve the transfer of data. Generally, a sender or transmitting device transmits a signal over a wide area. The signal is intended for a receiver or receiving device, which receives the transmitted signal. The transmitted signal can include data or other information and thus, the sender and the receiver establish communications.

Transmissions typically include communications between a mobile device and a base station. Communications from the mobile device to the base station are referred to as uplink communications. Communications from the base station to the mobile device are referred to as downlink communications.

The communications between the base station and the mobile device typically utilize a selected frequency or band for communication. As a result, uplink and downlink communications can interfere with each other and degrade communications. Scheduling techniques are needed to avoid uplink and downlink communications from interfering with each other. Semi persistent scheduling (SPS) is an example of such a scheduling technique.

Downlink (DL) and uplink (UL) transmissions are based on time durations of transmission on the radio link known as transmission time interval (TTI). To increase the data rate and to decrease end-to-end delay, techniques are required to enable communication with various TTIs and to support SPS for various TTIs.

BRIEF DESCRIPTION OF THE DRAWINGS

FIG. 4 is a diagram illustrating a Semi-persistent Scheduling (SPS) configuration (config) information element.

FIG. 5 is a diagram illustrating a Semi-persistent Scheduling (SPS) configuration (config) information element that supports legacy subframes and legacy indexing as well as short subframes.

DETAILED DESCRIPTION

Figure 1:
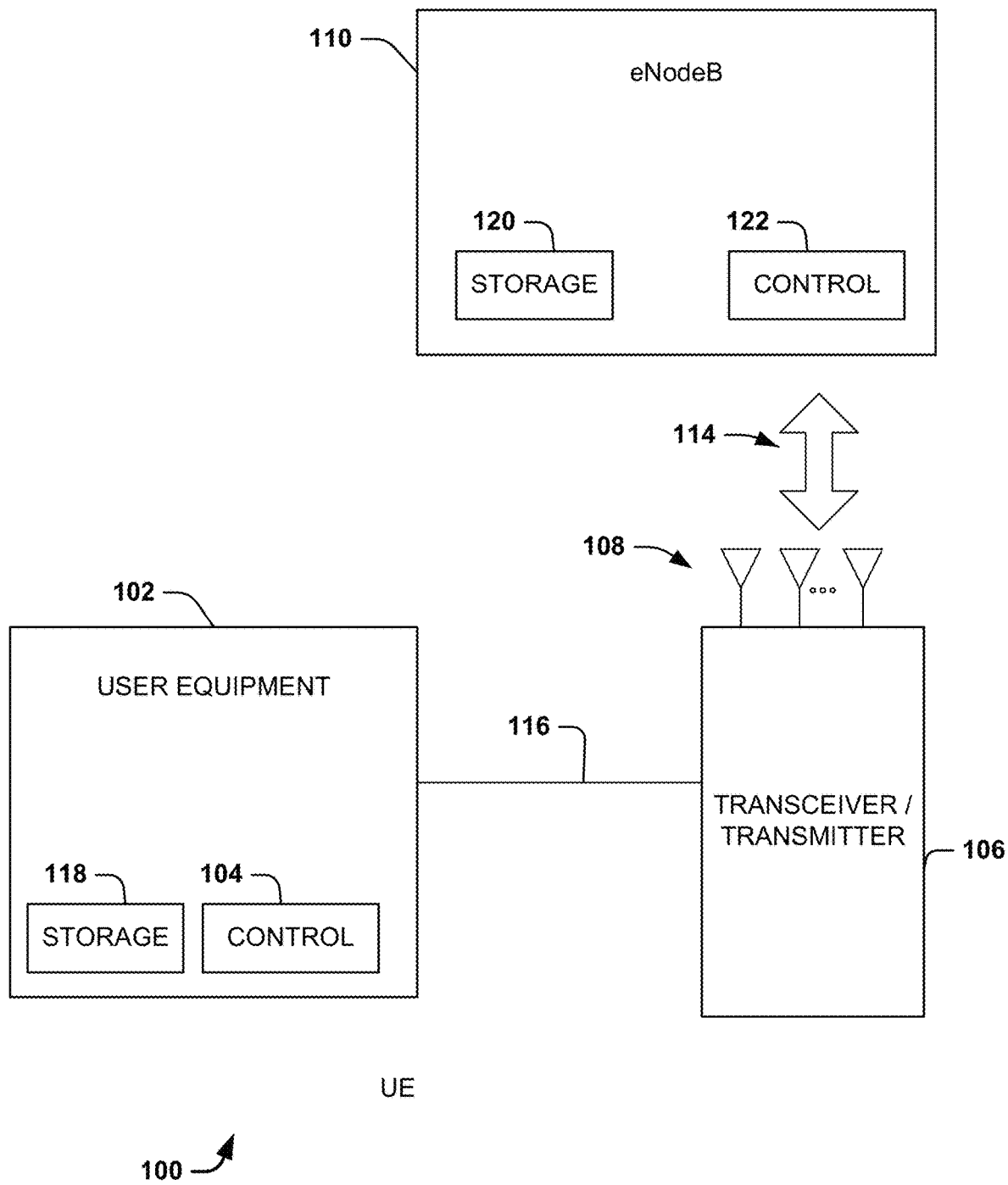
FIG. 1 is a diagram illustrating an arrangement utilizing Semi-Persistent Scheduling (SPS) that accommodates short subframes.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Mobile communications involves mobile devices, base stations, network devices and the like. An example of a mobile device is a user equipment (UE) device. An example of a base station is an evolved Node B (eNodeB). Communications from a mobile device to a base station are referred to as uplink communications. Communications from the base station to the mobile device are referred to as downlink communications.

The communications between the base station and the mobile device typically utilize a selected frequency or band for communication. Techniques are needed to avoid uplink and downlink communications from interfering with each other. Thus, scheduling techniques are used to mitigate contention or interference and permit uplink and downlink communications or directions of transfer.

One technique to facilitate communication and mitigate contention or interference is dynamic scheduling. Downlink resources are assigned when data is available. For data to be sent in the uplink, a mobile device dynamically requests transmission opportunities whenever data is available for uplink. Information about data being sent in downlink and uplink transmissions or directions is provided in a control channel, which can be sent at the beginning of a sub-frame.

One approach for scheduling uplink and downlink communications is dynamic scheduling. This approach is used for infrequent and bandwidth consuming data transmissions (e.g., web surfing, file download and the like). Each uplink or downlink transmission needs to be scheduled. As a result, dynamic scheduling requires a relatively large overhead due to the changing schedule.

Another approach for scheduling is semi-persistent scheduling (SPS) where a pattern of scheduling is established. A mobile device is assigned a predefined chunk or amount of resources at regular intervals. The mobile device is not required to request resource allocation and can simply use the predefined resources. The scheduling is semi-persistent in that a base station can modify the resource allocation if required. Thus, each uplink/downlink transmission or transmission opportunity does not require a separate configuration. The SPS significantly reduces scheduling overhead, especially for low bandwidth or low data rate communication, such as voice calls.

The 3$^{rd}$ Generation Partnership Project (3GPP) has suggested techniques to reduce latency for 3GPP Long Term Evolution (LTE). One technique to reduce Radio Access Network (RAN) latency and provide performance improvement is to reduce the Transmission Time Interval (TTI). In the following, the reduced TTI may be referred to as short TTI.

Embodiments are provided that support SPS techniques for short TTIs. The embodiments include techniques that utilize indexing or numbering for short TTIs and techniques that utilizing indexing that preserves legacy or current subframe numbering.

FIG. 1 is a diagram illustrating an arrangement 100 utilizing semi-persistent scheduling that accommodates short subframes. The short subframes include subframes having transmit time intervals less than 1 legacy subframe/TTI or less than 1 ms. The arrangement 100, which can also be an apparatus, uses techniques that permits specifying periodicity or intervals having the short subframes.

A legacy frame is a radio frame having a duration of 10 milli-seconds (ms) and 10 subframes, each subframe having a TTI of 1 ms. The legacy subframes are identified using legacy indexing or identification of sf 0, sf 1, sf 2, . . . to sf 9. A legacy SPS configuration is a configuration that identifies subframes and frames using the legacy indexing.

A short TTI frame is a radio frame having a duration, such as 10 ms, that has short subframes of lengths less than 1 legacy subframe/TTI or less than 1 ms. An SPS configuration is utilized to facilitate SPS using short subframes.

The arrangement 100 includes a user equipment (UE) 102 and an evolved Node B (eNodeB) 110. The UE 102 includes its transceiver 106, a storage component 118, and a controller 104. The storage component 118 includes a memory, storage element and the like and is configured to store information for the UE 102. The controller 104 is configured to perform various operations associated with the UE 102. The controller 104 can include logic, components, circuitry, one or more processors and the like. The transceiver 106 includes transmitter functionality and receiver functionality and uses one or more antenna 108 to transmit and receive signals.

The eNodeB 110 also includes a transceiver, a storage component 120, and a controller 122. The storage component 120 includes a memory, storage element and the like and is configured to store information for the eNodeB 110. The controller 122 is configured to perform various operations associated with the eNodeB. The controller 122 can include logic, components, circuitry, one or more processors and the like. The transceiver for the eNodeB 110 includes transmitter functionality and receiver functionality.

Communications 114 from the UE 102 to the eNodeB 110 includes uplink or uplink direction communication and communication from the eNodeB 110 to the UE 102 is downlink or downlink direction.

The communications 114 between the UE 102 and the eNodeB 110 can be configured to use dynamic scheduling for infrequent and bandwidth consuming data transmissions (e.g., web surfing, file download and the like). The communications 114 between the UE 102 and the eNodeB 110 can also be configured for semi-persistent scheduling (SPS) where a pattern or period of scheduling is established. The SPS is typically used for low bandwidth applications, such as voice calls and the like.

The eNodeB 110 is configured to enable SPS for communication with the UE 102 using Radio Resource Control (RRC) signaling. The RRC signaling is specific to the UE 102 and is provided in a RRC signaling message. Generally, the message specifies the interval between transmissions from the UE 102. The interval can be specified in subframes, which include legacy subframes and short subframes. The legacy subframes have a TTI of 1 ms wherein asht short subframes have a TTI of less than 1 ms. The UE 102 is configured to send transmissions on a physical data shared channel (PDSCH) at the specified interval and the eNodeB 110 is configured to use the specified downlink intervals for downlink communications. The eNodeB 110 is configured to release or disable SPS by using a RRC signaling message to disable SPS to the UE 102.

The controller 122 is configured to determine SPS parameters for the SPS configuration (Config) information element, which can be included with an RRC signaling message. The SPS parameters include legacy subframe uplink intervals, legacy subframe downlink intervals, short subframe uplink intervals, short subframe downlink intervals, uplink implicit release times value and the like. The SPS parameters are determined based on the TTI used for the communication between the eNB 110 and the UE 102 and other factors.

In one example, the SPS Config element includes an uplink SPS interval/field, semiPersistSchedIntervalUL, that defines a subframe interval for uplink communications using a Physical Uplink Shared Channel (PUSCH). The semiPersistSchedIntervalUL can also specify a number of empty transmissions before implicit release, referred to as implicitReleaseAfter.

An additional SPS uplink field is semiPersistSchedIntervalULsTTI, which specifies an SPS interval for uplink using short TTI or short subframes.

A downlink SPS interval/field, semiPersistSchIntervalDL, defines a subframe interval for downlink communications using a Physical Downlink Shared Channel (PDSCH).

An additional SPS downlink field is semiPersistSchedIntervalDLsTTI, which specifies an SPS interval for downlink using short TTI or short subframes.

It is appreciated that other suitable variations in the SPS Config element and techniques that accommodates short subframes for SPS are contemplated.

Additionally, the UE 102 is configured to perform Medium Access Control (MAC) functionalities and/or MAC entities. The MAC functionalities include functionalities to accommodate use of short subframes. Some examples for MAC functionalities are provided infra.

Further, the UE 102 and/or the eNodeB 110 are also configured to allow non-adaptive Hybrid Automatic Repeat Request (HARQ) retransmission in a configured uplink resource.

Figure 2:
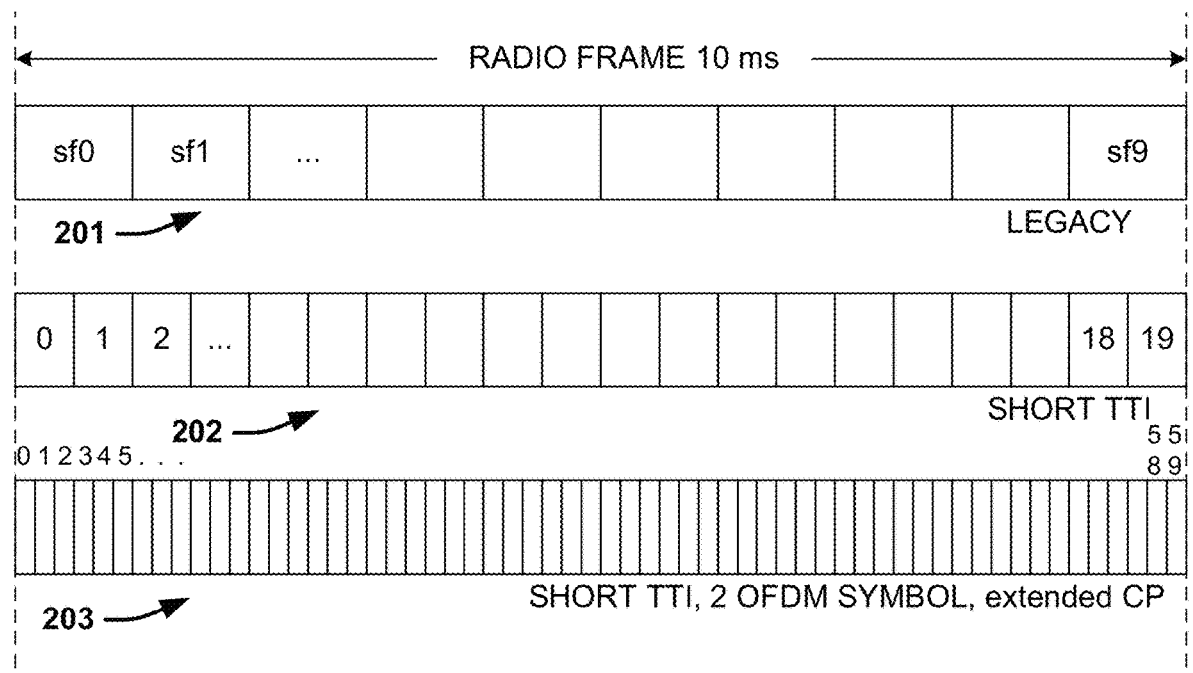
FIG. 2 is a diagram showing a scheme for various transmission time intervals (TTIs) showing short TTI subframe numbering without preserving legacy subframe numbering.

FIG. 2 is a diagram showing a scheme 200 for various transmission time intervals (TTIs) showing short TTI subframe numbering without preserving legacy subframe numbering. The numbering, also referred to as indexing is provided for illustrative purposes and it is appreciated that other examples are contemplated. In this example, a radio frame having a time duration of 10 ms is shown.

A legacy frame 201 illustrates an example structure or configuration using legacy subframes. The legacy frame 201 includes 10 subframes, each having a legacy transmission time interval (TTI) of 1 ms. The subframes are denoted/identified using a subframe index of 0 to S−1, where S is a number of subframes. In this example, S=10 and the subframes are identified using an index of 0, 1, . . . to 9, and shown as sf0, sf1, . . . to sf9. This subframe index is also referred to as a legacy subframe index and is limited to 0, 1, . . . to 9. Thus, more than 10 subframes cannot be identified.

An SPS configuration can identify subframes to be used for uplink and/or downlink transfers by using the legacy subframe index of sf0, sf1, . . . to sf9.

A short TTI frame 202 depicts an example frame structure or configuration using short TTI subframes. These are subframes having a TTI of less than 1 legacy subframe duration (i.e., less than 1 ms). In this example, each short subframe has a TTI of 0.5 ms. The subframes are denoted using a subframe index of 0 to N−1, where N is the number of subframes in a radio frame. In this example, there are 20 subframes, thus N=20. The short subframes are indexed by 0, 1, . . . to 19.

It is noted that legacy indexing is unable to address or identify all of the short TTI subframes. Thus, an SPS configuration using legacy indexing is also unable to address or identify all of the short TTI subframes.

Another non-limiting example of short TTI frame 203 is shown where the frame 203 includes 60 short subframes. These short subframes also have a TTI of less than 1 legacy subframe and, in this example, have a TTI of 2 orthogonal frequency division multiplexing (OFDM) symbols with an extended cyclic-prefix (CP). The short subframes are denoted using a subframe index of 0 to M−1, where M is the number of subframes in a radio frame. In this example, there are 60 subframes, thus M=60. The short subframes are indexed by 0, 1, . . . to 59.

Again, legacy indexing is unable to address or identify all of the short TTI subframes. Thus, an SPS configuration using legacy indexing is also unable to address or identify all of the short TTI subframes, which in this example would include 60 subframes.

Figure 3:
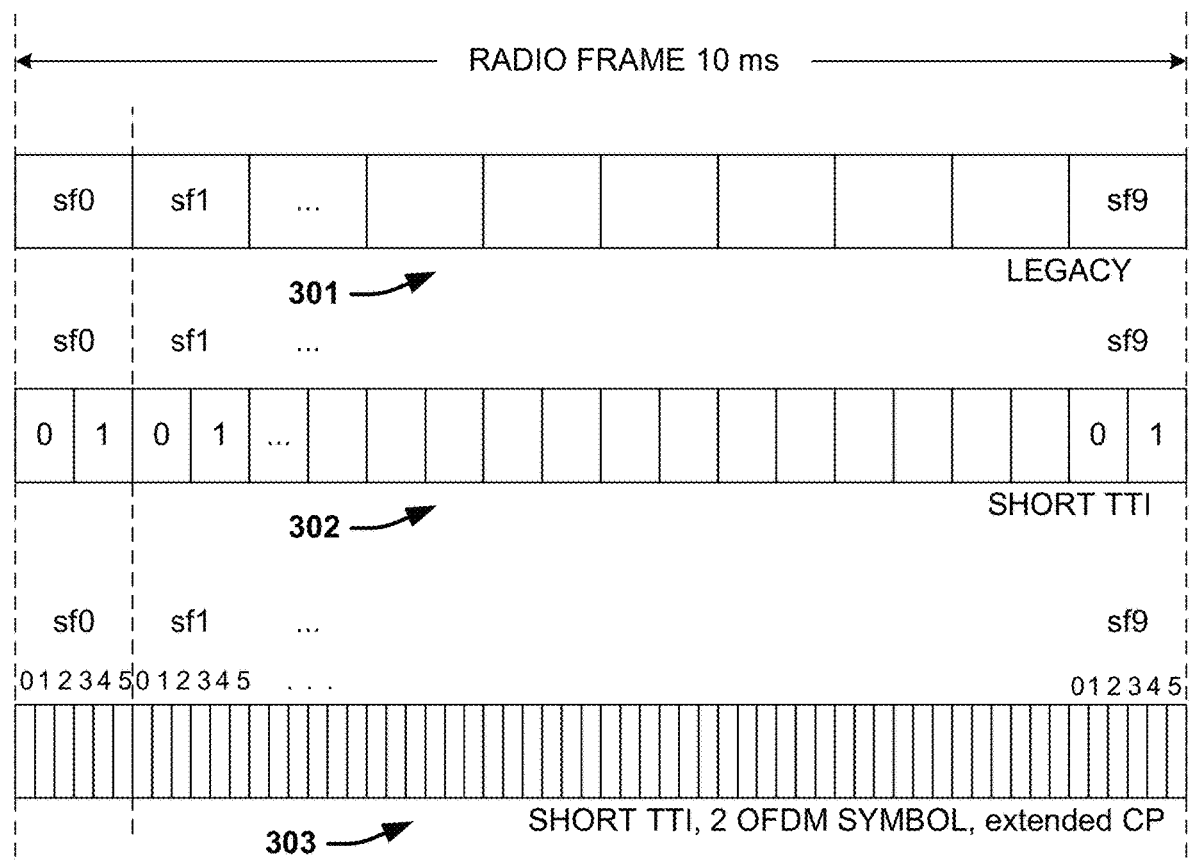
FIG. 3 is a diagram showing a scheme for various transmission time intervals (TTI) showing short TTI subframe numbering utilizing legacy subframe numbering.

FIG. 3 is a diagram showing schemes 300 for various transmission time intervals (TTI) showing short TTI subframe numbering utilizing legacy subframe numbering. The numbering, also referred to as indexing is provided for illustrative purposes and it is appreciated that other examples are contemplated. In this example, a radio frame having a time duration of 10 ms is shown.

A legacy frame 301 illustrates an example structure or configuration using legacy subframes. The legacy frame 301 includes 10 subframes, each having a legacy transmission time interval (TTI) of 1 ms. The subframes are denoted/identified using a subframe index of 0 to S−1, where S is a number of subframes. In this example, S=10 and the subframes are identified using an index of 0, 1, . . . to 9, and shown as sf0, sf1, . . . to sf9. This subframe index is also referred to as a legacy subframe index and is limited to 0, 1, . . . to 9. Thus, more than 10 subframes cannot be identified.

An SPS configuration can identify subframes to be used for uplink and/or downlink transfers by using the legacy subframe index of sf0, sf1, . . . to sf9.

A short TTI frame 302 depicts an example frame structure or configuration using short TTI subframes with a legacy subframe index and a short subframe index. These are subframes having a TTI of less than 1 ms. In this example, each short subframe has a TTI of 0.5 ms. The legacy subframe index generally references a set or number of short subframes. The legacy subframe indexes/indices of sf0, sf1, . . . to sf9 are shown for the frame 302. The short subframe index is used in conjunction with the legacy subframe index to uniquely identify each short subframe. The short subframe index is also referred to as a mini-subframe index or sub-subframe index. The short subframe index has a value ranging from 0 to M−1, where M is a number of a short subframes within a legacy subframe. In this example, there are two short subframes within a legacy subframe, thus M=2. The short subframe index has values of 0 or 1.

In this example, there are 2 short subframes associated with each legacy subframe index. Thus, a first short subframe in legacy subframe sf0 is identified by sf0, ssf0 and a second short subframe in legacy subframe sf0 is identified by sf0, ssf1.

It is noted that using both the legacy subframe index and the short subframe index permits legacy SPS configurations and enhanced or short subframe (ssf) SPS configuration. The legacy SPS configurations merely use the legacy subframe (sf) index, which defaults to a first or zero ssf index. Thus, the legacy SPS configuration are compatible with the scheme 300 or 302, although some of the subframes are not addressable.

Another short TTI frame 303 is shown where the frame 303 includes 60 short subframes.

The short TTI frame 303 depicts an example frame structure or configuration using short TTI subframes with a legacy subframe index and a short subframe index. These are subframes having a TTI of less than 1 legacy subframe/TTI and, in this example, have a TTI of 2 orthogonal frequency division multiplexing (OFDM) symbols with an extended cyclic-prefix (CP).

The subframes are denoted using a legacy subframe index of 0 to S−1, where S=10. The legacy subframe index generally references a set or number of short subframes. The legacy subframe indexes of sf0, sf1, . . . to sf9 are shown for the frame 303. The short subframe index is used in conjunction with the legacy subframe index to uniquely identify each short subframe. The short subframe index is also referred to as a mini-subframe index or sub-subframe index. The short subframe index has a value ranging from 0 to M−1, where M is a number of a short subframe within a legacy subframe. In this example, there are six short subframes with a legacy subframe index, thus M=6. The short subframe index has values of 0, 1 . . . to 5.

In this example, there are six short subframes associated with the legacy subframe index of sf1. Thus, a first short subframe is identified by sf1 and ssf0 while a second short subframe is identified by sf1 and ssf1.

It is noted that using both the legacy subframe index and the short subframe index permits legacy SPS configurations and enhanced or short subframe (ssf) SPS configuration.

Short TTI SPS configurations use both the legacy subframe (sf) index and the short subframe (ssf) index to access all of the short subframes in the frame 303. Legacy SPS configurations merely use the legacy subframe (sf) index, which defaults to a first or zero ssf index. Thus, legacy SPS configurations are compatible with the scheme 303, although some of the subframes are not addressable.

It is appreciated that other subframe indexes or values are contemplated. Some other suitable values for M include 1, 2, 3, 4, 5, 6, 9, 11, and 13. In another example, M is equal to 9 plus 10 times 1, 2, 3, 4, 5, 6, 9, 11 and 13, i.e., 19, 29, . . . 139.

FIG. 4 is a diagram illustrating a Semi-persistent Scheduling (SPS) configuration (config) information element 400. The element 400 supports short subframes without explicit support for legacy frames. The element 400 is provided as an example and it is appreciated that suitable variations of the configuration element 400 are contemplated. The SPS Config element 400 can be utilized with the arrangement 100 and variations thereof.

As described above, an SPS interval is configured in terms of short subframes for both uplink and downlink by Radio Resource Control (RRC) signaling. Here, an eNodeB is configured to set the SPS using semiPersistSchIntervalDL and semiPersistSchedIntervalUL fields in the SPS configuration information element 400.

The SPS configuration information element 400 includes a configuration for downlink, referred to as SPS-ConfigDL and a configuration for uplink, referred to as SPS-ConfigUL. These configurations are also referred to as fields.

The SPS-ConfigDL includes the semiPersistSchIntervalDL field. The semiPersistSchIntervalDL, in this example, includes a list of possible DL SPS intervals in terms of short subframe (ssf) values or intervals. The element 400 shows an example list of possible DL SPS intervals of ssf10, ssf20, ssf32, ssf40, ssf64, ssf80, ssf128, ssf160, where ssf refers to short subframe duration.

The SPS-ConfigUL includes the semiPersistSchIntervalUL and an implicitReleaseAfter fields. The semiPersistSchIntervalUL includes a list of possible UL SPS intervals in terms of short subframe intervals or values. The element 400 shows an example list of possible UL SPS intervals of ssf1, ssf2, ssf5, ssf10, ssf20, ssf32, ssf40, ssf64, ssf80, ssf128, ssf160, ssf320, and ssf640.

The implicitReleaseAfter field specifies a number of empty uplink transmissions to release the SPS.

Example intervals and values are shown for the various fields/elements for illustrative purposes. It is appreciated that other values can be utilized.

FIG. 5 is a diagram illustrating a Semi-persistent Scheduling (SPS) configuration (config) information element 500 that supports legacy subframes and legacy indexing as well as short subframes. The element 500 is provided as an example and it is appreciated that suitable variations of the configuration element 500 are contemplated.

An SPS interval is configured in terms of legacy and short subframes for both uplink and downlink by Radio Resource Control (RRC) signaling using SPS-ConfigDL and SPS-ConfigUL Information Elements in the SPS configuration information element 500.

The SPS configuration information element 500 includes a configuration for downlink, referred to as SPS-ConfigDL and a configuration for uplink, referred to as SPS-ConfigUL. These configurations are also referred to as fields.

The SPS-ConfigDL includes the semiPersistSchIntervalDL and semiPersistSchedIntervalDLsTTI configuration elements or fields. The semiPersistSchIntervalDL includes a list of possible DL SPS intervals in terms of legacy subframe durations or values. The element 500 shows an example list of possible DL SPS intervals of sf10, sf20, sf32, sf40, sf64, sf80, sf128, sf160, where sf refers to legacy subframe duration.

The semiPersistSchedIntervalDLsTTI field includes a list of possible DL SPS intervals in terms of short subframe durations or values. In this example, the semiPersistSchedIntervalDLsTTI field is shown having possible DL SPS intervals values of ssf1, ssf2, and ssf5, where ssf refers to short-subframe duration.

The semiPersistSchIntervalDL and semiPersistSchedIntervalDLsTTI fields are used to identify subframes for downlink directions or transfers using SPS.

The SPS-ConfigUL includes the semiPersistSchIntervalUL, semiPersistSchedIntervalULsTTI and implicitReleaseAfter configuration elements or fields. The semiPersistSchIntervalUL includes a list of possible UL SPS intervals in terms of legacy subframe durations or values. The element 500 shows an example list of possible UL SPS intervals of sf1, sf2, sf5, sf10, sf20, sf32, sf40, sf64, sf80, sf128, sf160, sf320, and sf640, where sf refers to legacy subframe duration.

The semiPersistSchedIntervalULsTTI field includes a list of possible UL SPS intervals in terms of short subframe durations or values. In this example, the semiPersistSched- IntervalULsTTI field is shown having values of ssf1, ssf2, ssf5, ssf10, ssf20, ssf32, ssf40, ssf64, ssf80, ssf128, ssf160, ssf320, and ssf640 where ssf refers to short-subframe duration.

The semiPersistSchedIntervalDL field defines a semi-persistent scheduling (SPS) interval in downlink. The index or value is in number of sub-frames.

A value sf1 corresponds to 1 sub-frames, sf2 corresponds to 2 sub-frames and so on. For TDD, in one example, the UE may round this parameter down to the nearest integer (of 10 sub-frames) with a minimum value of 10 sub-frames, i.e., the rounding operation is not performed for intervals smaller than 10 sub-frames.

The semiPersistSchedIntervalDLsTTI field describes a semi-persistent scheduling (SPS) interval in downlink using short subframes or short TTI. Values are specified in number(s) of short TTI or short sub-frames. Value ssf1 corresponds to 1 short sub-frame, ssf2 corresponds to 2 short sub-frames and so on.

The semiPersistSchedIntervalUL field defines SPS intervals for uplink. Values are specified in number of sub-frames. A value of sf1 corresponds to 1 sub-frame, sf2 corresponds to 2 sub-frames and the like. For TDD, in one example, the UE rounds this parameter down to the nearest integer (of 10 sub-frames) with minimum value 10 sub-frames, i.e., the rounding operation is not performed for intervals smaller than 10 sub-frames.

The semiPersistSchedIntervalULsTTI field defines SPS intervals for uplink using short subframes or short TTI. Value ssf1 corresponds to 1 short sub-frame, ssf2 corresponds to 2 short sub-frames and the like.

The implicitReleaseAfter field specifies a number of empty uplink transmissions to release the SPS.

Example intervals and values are shown for the various fields/elements for illustrative purposes. It is appreciated that other values can be utilized.

Once SPS is enabled, the UE infers a next grant based on the intervals shown in the configuration 500.

For short TTI with more than 10 TTIs per radio frame, or multiple short-subframes within a legacy subframe, the conditions below are followed based upon an agreed or configured design of PDCCH and PDSCH/PUSCH subframe/TTI number or indexing for short subframes.

An example of using SPS with higher layers follows.

After a Semi-Persistent downlink assignment is configured, a Medium Access Control (MAC) entity shall consider sequentially that the $N^{th}$ assignment occurs in the subframe for which:

$$(10*SFN+\text{subframe})=[(10*SFN_{start\ time}+\text{subframe}_{start\ time})+N*\text{semiPersistSchedIntervalDL}]\ \text{modulo}\ 10240.$$

Where $SFN_{start\ time}$ and $\text{subframe}_{start\ time}$ are the SFN and subframe, respectively, at the time the configured downlink assignment were (re-)initialised.

After a Semi-Persistent Scheduling (SPS) uplink grant is configured, the MAC entity shall:

if twoIntervalsConfig is enabled by upper layer:
set the Subframe_Offset
else:
set Subframe_Offset to 0.
consider sequentially that the $N^{th}$ grant occurs in the subframe for which:

$$(10*SFN+\text{subframe})=[(10*SFN_{start\ time}+\text{subframe}_{start\ time})+N*\text{semiPersistSchedIntervalUL}+\text{Subframe\_Offset}*(N\ \text{modulo}\ 2)]\ \text{modulo}\ 10240.$$

Where $SFN_{start\ time}$ and $\text{subframe}_{start\ time}$ are the SFN and subframe, respectively, at the time the configured uplink grant were (re-)initialised.

In another example, conditions are defined for when the legacy subframe numbering is preserved and short TTIs/subframes are identified by short-subframe indices within the legacy subframe. For downlink (DL), a condition for $N^{th}$ sequential assignment can be given as the short_subframe for which $$M*(10*SFN+\text{subframe})+\text{short\_subframe}=[M*(10*SFN_{start\ time}+\text{subframe}_{start\ time})+\text{short\_subframe}_{start\ time}+N*\text{semiPersistSchedIntervalDLsTTI}]\ \text{modulo}\ (M*10240).$$

Where $SFN_{start\ time}$, $\text{subframe}_{start\ time}$ and $\text{short\_subframe}_{start\ time}$ are the SFN, subframe and short-subframe, respectively, at the time the configured downlink assignment were (re-)initialised, and M is the number of short-subframes per legacy subframe (e.g., 2 when slot based short TTI is used).

Similarly, for uplink (UL), a condition for Nth sequential assignment can be given as the short_subframe for which $$M*(10*SFN+\text{subframe})+\text{short\_subframe}=[M*(10*SFN_{start\ time}+\text{subframe}_{start\ time})+\text{short\_subframe}_{start\ time}+N*\text{semiPersistSchedIntervalULsTTI}+\text{Subframe\_Offset}*(N\ \text{modulo}\ 2)]\ \text{modulo}\ (M*10240).$$

Where $SFN_{start\ time}$, $\text{subframe}_{start\ time}$ and $\text{short\_subframe}_{start\ time}$ are the SFN, subframe and short-subframe, respectively, at the time the configured uplink assignment were (re-)initialised, and M is the number of short-subframes per legacy subframe (e.g., 2 when slot based short TTI is used).

In a next example, conditions are defined when the legacy subframe numbering is not preserved and short TTIs are identified by short-subframe indices within the legacy radio frame. An example of the legacy subframe numbering not being preserved is shown above with regards to FIG. 2. For downlink (DL), the condition for $N^{th}$ sequential assignment can be given as the short_subframe for which $$(S*SFN+\text{short\_subframe})=[(S*SFN_{start\ time}+\text{short\_subframe}_{start\ time})+N*\text{semiPersistSchedIntervalDLsTTI}]\ \text{modulo}\ (S*1024).$$

Where $SFN_{start\ time}$, $\text{subframe}_{start\ time}$ and $\text{short\_subframe}_{start\ time}$ are the SFN, subframe and short-subframe, respectively, at the time the configured downlink assignment were (re-)initialised, and S is the number of short-subframes per legacy radio frame (e.g., 20 when slot based short TTI is used).

Similarly, for uplink (UL), the condition for Nth sequential assignment can be given as the short_subframe for which $$(S*SFN+\text{short\_subframe})=[(S*SFN_{start\ time}+\text{short\_subframe}_{start\ time})+N*\text{semiPersistSchedIntervalULsTTI}+\text{Subframe\_Offset}*(N\ \text{modulo}\ 2)]\ \text{modulo}\ (S*1024).$$

Where $SFN_{start\ time}$, $\text{subframe}_{start\ time}$ and $\text{short\_subframe}_{start\ time}$ are the SFN, subframe and short-subframe, respectively, at the time the configured uplink assignment were (re-)initialized, and S is the number of short-subframes per legacy radio frame (e.g., 20 when slot based short TTI is used).

Figure 6:
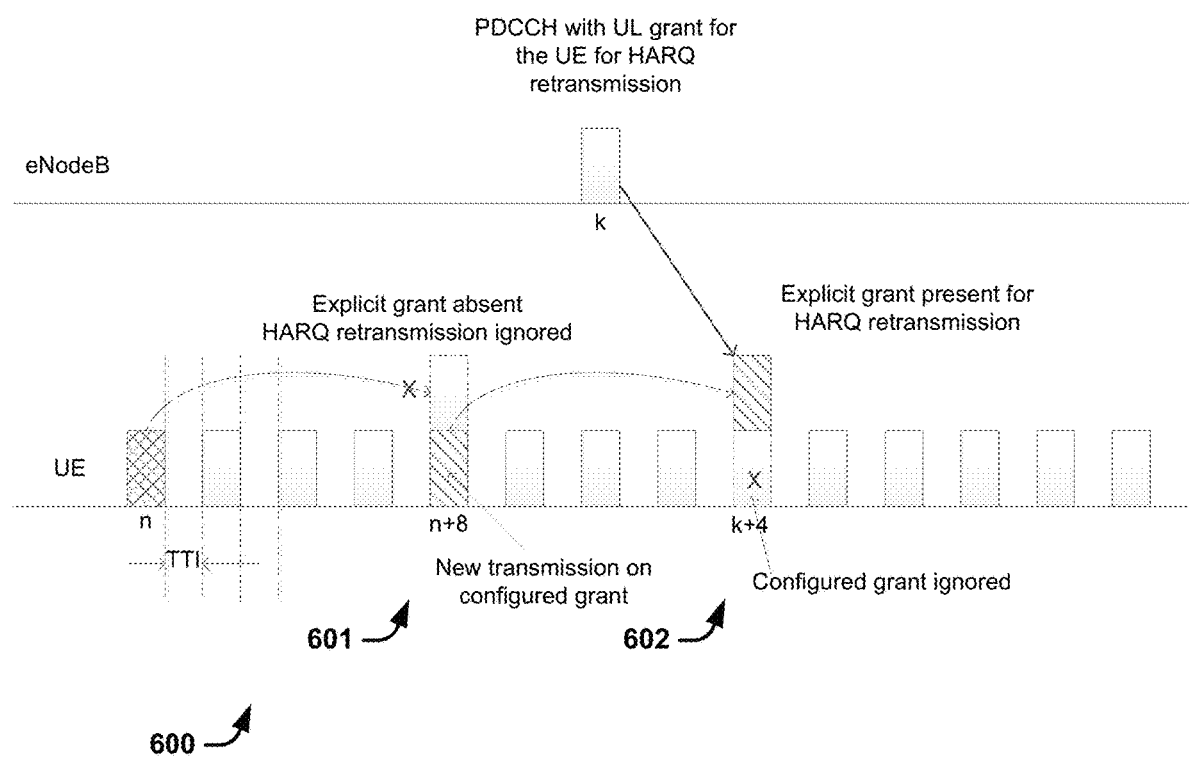
FIG. 6 is a diagram illustrating an example of a control channel specifying an uplink grant for HARQ retransmission.

FIG. 6 is a diagram 600 illustrating an example of a control channel specifying an uplink grant for HARQ retransmission. In this 600, a physical downlink control channel (PDCCH) includes an uplink (UL) grant for a User Equipment (UE) for a HARQ retransmission. The example 600 is provided for illustrative purposes and it is appreciated that variations are contemplated.

With 1 TTI SPS interval, according to current LTE specification, HARQ retransmission of UL data sent on SPS-configured resources is done using adaptive retransmissions on UL resource grants explicitly signaled using PDCCH. This is because as per current LTE standards, unless an explicit grant on PDCCH is received, a configured grant causes a New Data Indicator (NDI) bit for the corresponding HARQ process to be toggled, which in turn triggers a new transmission instead of HARQ retransmission even though a HARQ buffer for the HARQ process is not empty. Therefore, as there is always a configured grant in case of 1 TTI SPS interval, this resource cannot by itself be used for HARQ retransmissions without explicit signaling.

The same problem can exist for other shorter SPS intervals, for example, 2 TTI, 4 TTI and 8 TTI in frequency division duplex (FDD) mode as the current round trip time (RTT) of synchronous UL HARQ (which is 8 TTI) would be integer multiple of SPS periodicity. This is because there will always be a configured UL grant in the TTI when synchronous HARQ retransmission should occur, which will be used to generate new transmission, unless an UL grant is explicitly signaled using PDCCH for that TTI.

FIG. 6 shows a configured UL grant at 601. The UE provides a new transmission at 601 absent an explicit grant from the eNodeB. When an explicit grant is not provided in the PDCCH, HARQ retransmission is ignored. However, at 602, an explicit grant is present for a HARQ retransmission and a configured grant is ignored.

The HARQ retransmissions require explicit signaling by PDCCH which can significantly increase PDCCH load. In addition to increased PDCCH load, there can be additional challenges if the UL grant can be ignored, i.e., no UL transmission happens if the UE has no data to transmit in the uplink. This is in contrast to existing standard where a padding PDU would be transmitted. When UL grant skipping is allowed, the eNodeB may not be aware whether the UL is absent or UL is failed. So, even if the eNodeB is configured to support HARQ retransmissions using explicit signaling, the decision may be erroneous. Specifically, the eNodeB may not send an explicit grant assuming that a UL transmission was skipped when the UE performed the UL transmission, but the UL transmission got lost and the eNodeB unable to detect it.

Figure 7:
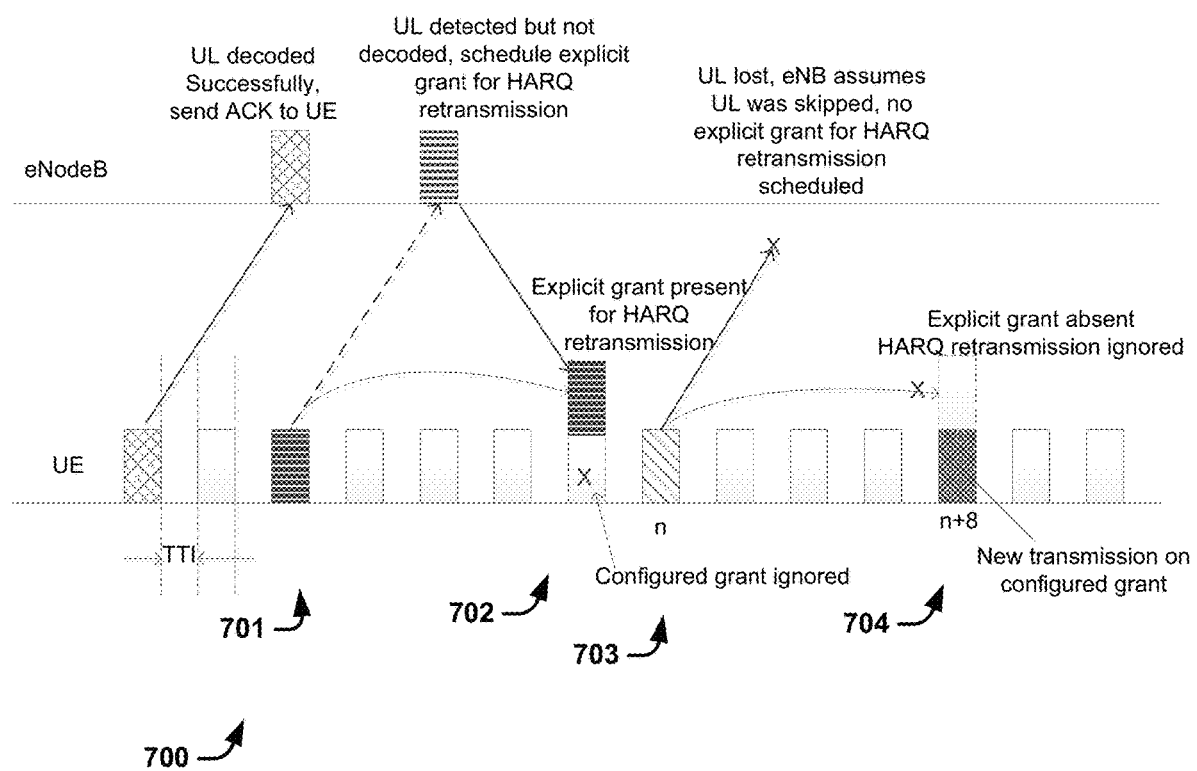
FIG. 7 is a diagram illustrating an example having a control channel specifying an uplink grant for HARQ retransmission where the transmission is lost.

FIG. 7 is a diagram illustrating an example 700 having control channel specifying an uplink grant for HARQ retransmission where the transmission is lost. In this example 700, a physical downlink control channel (PDCCH) includes an uplink (UL) grant for a User Equipment (UE) for a HARQ retransmission. The example 700 is provided for illustrative purposes and it is appreciated that variations are contemplated.

The UE provides a new transmission at 701 absent an explicit grant from the eNodeB using a configured grant. When an explicit grant is not provided in the PDCCH, HARQ retransmission is ignored. The eNodeB detects the UL transmission and schedules an explicit grant for HARQ retransmission at 702. Thus, at 702, an explicit grant is present for a HARQ retransmission and a configured grant is ignored.

At 703 a configured grant occurs and the UE provides an UL transmission. However, the eNodeB may not receive the UL transmission and assumes an UL transmission was skipped. As a result of the skip, the eNodeB does not generate or schedule an explicit grant for HARQ retransmission.

At 704, there should be an explicit grant for HARQ retransmission, but the eNodeB has not provided the grant due to the UL transmission at 703 being lost. The UE ignores the UL HARQ retransmission, and instead sends a new transmission as the eNodeB is expecting a new UL transmission using a configured grant at 704.

To mitigate the issues identified with regard to FIG. 7, including ignored UL HARQ retransmissions, the MAC protocol can be configured to allow non-adaptive retransmission on configured UL grants. This may be detrimental for some traffic for which SPS was originally intended, such as voice over internet protocol (VoIP) where on-time delivery may be more crucial than reliability. However, in other embodiments, non-adaptive retransmission on configured UL grants may be allowed only for SPS periods below certain threshold. In yet another embodiment, non-adaptive retransmission on configured UL grants may be allowed only for certain traffic types requiring low latency and/or high reliability or based on other traffic characteristics/criteria.

When an SPS interval of 1 TTI is configured, according to current LTE specification, a UE may be prevented from entering Discontinuous Reception (DRX) sleep. This is because when downlink assignment has been configured via a DL SPS and if the configured assignment occurs in a subframe that does not fall in a DRX Active time, the UE does not decode the PDSCH, i.e., the transmission is lost. Therefore it is the eNodeB's responsibility to ensure that a configured assignment falls during active DRX time. When the SPS periodicity is 1 TTI, this is achieved by letting the UE continually monitor PDCCH on every TTI.

Figure 8:
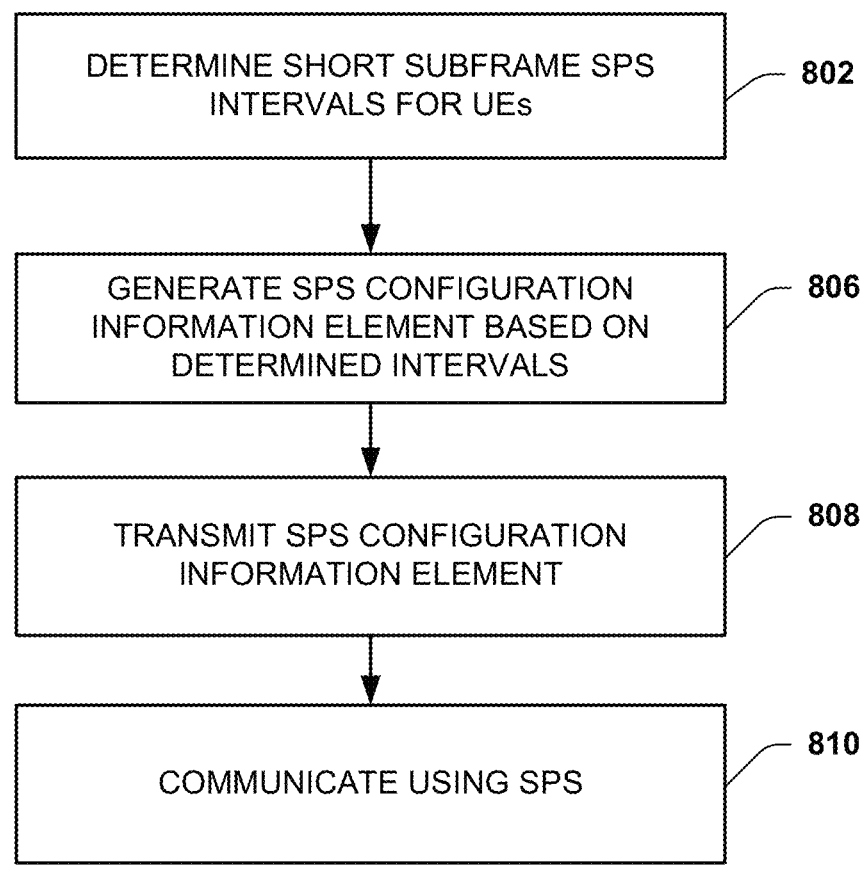
FIG. 8 is a flow diagram illustrating a method of performing semi-persistent scheduling (SPS) using short subframes.

FIG. 8 is a flow diagram illustrating a method 800 of performing semi-persistent scheduling (SPS) using short subframes. The method 800 permits use of legacy subframes, which are subframes having a transmit time interval (TTI) of 1 ms or greater and short subframes, which are subframes having a TTI of less than 1 legacy subframe.

The method 800 begins at block 802 where an evolved Node B (eNodeB) determines short subframe downlink intervals and/or short subframe uplink intervals for one or more user equipment (UEs). The eNodeB can also determine an implicit release time for uplink. The intervals can be specified in terms of short subframes, such as ssf1, ssf2, ... ssfM, where M is an integer. The intervals can also be specified in terms of a combination of legacy subframes such as sf1, sf2, ... sfS, where S is an integer and short subframes indexes.

The eNodeB generates an SPS configuration information element at block 806 that includes the short subframe uplink intervals, the short subframe downlink intervals, and/or legacy subframe uplink/downlink intervals. The configuration includes an SPS-ConfigDL element that includes the determined downlink intervals and/or an SPS-ConfigUL element that includes the determined uplink intervals. The SPS-ConfigUL can also include an implicit release time for allowing a UE to end or disable SPS.

The eNodeB transmits the SPS configuration information element using radio resource control (RRC) signaling at block 808.

The eNodeB and the one or more UEs communicate using SPS based on the SPS configuration information element at block 810. The communication includes utilizing the determined uplink and downlink short subframe intervals and/or uplink and downlink legacy subframe intervals.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
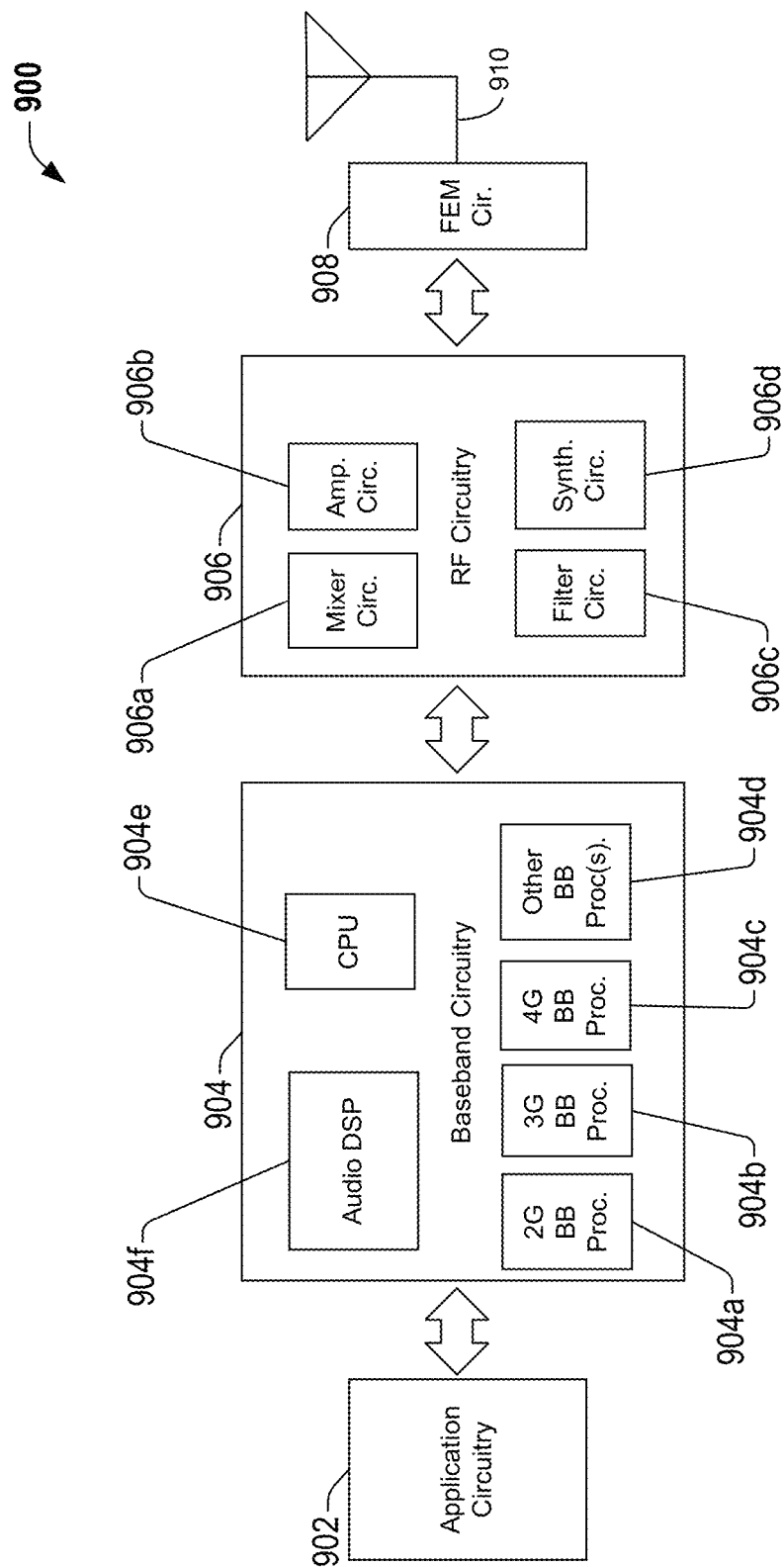
FIG. 9 illustrates example components of a User Equipment (UE) device.

Embodiments described herein can be implemented into a system using any suitably configured hardware and/or software. FIG. 9 illustrates, for one embodiment, example components of a User Equipment (UE) device 900. In some embodiments, the UE device 900 (e.g., the wireless communication device) can include application circuitry 902, baseband circuitry 904, Radio Frequency (RF) circuitry 906, front-end module (FEM) circuitry 908 and one or more antennas 910, coupled together at least as shown.

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 904 can include circuitry such as, but not limited to, one or more single-core or multi-core processors. The baseband circuitry 904 can include one or more baseband processors and/or control logic to process baseband signals received from a receive signal path of the RF circuitry 906 and to generate baseband signals for a transmit signal path of the RF circuitry 906. Baseband processing circuitry 904 can interface with the application circuitry 902 for generation and processing of the baseband signals and for controlling operations of the RF circuitry 906. For example, in some embodiments, the baseband circuitry 904 can include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) can handle various radio control functions that enable communication with one or more radio networks via the RF circuitry 906. The radio control functions can include, but are not limited to, signal modulation/demodulation, encoding/decoding, radio frequency shifting, etc. In some embodiments, modulation/demodulation circuitry of the baseband circuitry 904 can include Fast-Fourier Transform (FFT), precoding, and/or constellation mapping/demapping functionality. In some embodiments, encoding/decoding circuitry of the baseband circuitry 904 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 can be configured to run elements of the protocol stack for signaling of the PHY, MAC, RLC, PDCP and/or RRC layers. In some embodiments, the baseband circuitry can include one or more audio digital signal processor(s) (DSP) 904f. The audio DSP(s) 904f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 904 and the application circuitry 902 can be implemented together such as, for example, on a system on a chip (SOC).

In some embodiments, the baseband circuitry 904 can provide for communication compatible with one or more radio technologies. For example, in some embodiments, the baseband circuitry 904 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various embodiments, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some embodiments, the RF circuitry 906 can include a receive signal path and a transmit signal path. The receive signal path of the RF circuitry 906 can include mixer circuitry 906a, amplifier circuitry 906b and filter circuitry 906c. The transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some embodiments, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some embodiments, the output baseband signals can be zero-frequency baseband signals, although this is not a requirement. In some embodiments, mixer circuitry 906a of the receive signal path can comprise passive mixers, although the scope of the embodiments is not limited in this respect.

In some embodiments, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c. The filter circuitry 906c can include a low-pass filter (LPF), although the scope of the embodiments is not limited in this respect.

In some embodiments, the mixer circuitry 906a of the receive signal path and the mixer circuitry 906a of the transmit signal path can include two or more mixers and can be arranged for quadrature downconversion and/or upconversion respectively. In some embodiments, the mixer circuitry 906a of the receive signal path and the mixer circuitry 906a of the transmit signal path can include two or more mixers and can be arranged for image rejection (e.g., Hartley image rejection). In some embodiments, the mixer circuitry 906a of the receive signal path and the mixer circuitry 906a can be arranged for direct downconversion and/or direct upconversion, respectively. In some embodiments, the mixer circuitry 906a of the receive signal path and the mixer circuitry 906a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode embodiments, a separate radio IC circuitry can be provided for processing signals for each spectrum, although the scope of the embodiments is not limited in this respect.

In some embodiments, the synthesizer circuitry 906d can be a fractional-N synthesizer or a fractional N/N+8 synthesizer, although the scope of the embodiments is not limited in this respect as other types of frequency synthesizers can be suitable. For example, synthesizer circuitry 906d can be a delta-sigma synthesizer, a frequency multiplier, or a synthesizer comprising a phase-locked loop with a frequency divider.

The synthesizer circuitry 906d can be configured to synthesize an output frequency for use by the mixer circuitry 906a of the RF circuitry 906 based on a frequency input and a divider control input. In some embodiments, the synthesizer circuitry 906d can be a fractional N/N+8 synthesizer.

In some embodiments, frequency input can be provided by a voltage controlled oscillator (VCO), although that is not a requirement. Divider control input can be provided by either the baseband circuitry 904 or the applications processor 902 depending on the desired output frequency. In some embodiments, a divider control input (e.g., N) can be determined from a look-up table based on a channel indicated by the applications processor 902.

Synthesizer circuitry 906d of the RF circuitry 906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 906 can include an IQ/polar converter.

FEM circuitry 908 can include a receive signal path which can include circuitry configured to operate on RF signals received from one or more antennas 980, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 910.

In some embodiments, the FEM circuitry 908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 980.

In some embodiments, the UE device 900 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an apparatus configured to be employed within an evolved Node B (eNodeB). The apparatus includes control circuitry. The control circuitry is configured to configure a semi-persistent scheduling (SPS) configuration that accommodates short subframes, wherein the short subframes have a transmit time interval (TTI) of less than duration of 1 ms and provide the SPS configuration within a radio resource control (RRC) signaling.

Example 2 includes the subject matter of Example 1, including or omitting optional elements, further comprising a transceiver configured to provide the SPS configuration to a user equipment (UE) within an RRC message.

Example 3 includes the subject matter of any of Examples 1-2, including or omitting optional elements, where the control circuitry is configured to activate, re-activate, or release SPS by providing a command using a downlink control information (DCI), wherein the command includes one of an activation command, a reactivation command or release command.

Example 4 includes the subject matter of any of Examples 1-3, including or omitting optional elements, where the command can be associated with either legacy subframe durations, short subframe durations or both legacy and short subframe durations.

Example 5 includes the subject matter of any of Examples 1-4, including or omitting optional elements, where the control circuitry is configured to activate or re-activate SPS for both legacy subframes and short subframes concurrently.

Example 6 includes the subject matter of any of Examples 1-5, including or omitting optional elements, where the SPS configuration includes an uplink interval for short subframes, a downlink interval for short subframes, a legacy uplink interval for legacy subframes and a short subframe uplink interval for short subframes, wherein the legacy subframes have a duration of 1 ms.

Example 7 includes the subject matter of any of Examples 1-6, including or omitting optional elements, where the SPS configuration includes an uplink implicit release time/count.

Example 8 includes the subject matter of any of Examples 1-7, including or omitting optional elements, where the control circuitry is configured to generate a Medium Access Control (MAC) entity to accommodate both legacy and short subframes concurrently.

Example 9 includes the subject matter of any of Examples 1-8, including or omitting optional elements, where the control circuitry is configured to allow non-adaptive Hybrid Automatic Repeat Request (HARQ) retransmission in a configured uplink resource.

Example 10 includes the subject matter of any of Examples 1-9, including or omitting optional elements, where the SPS configuration includes a short subframe index having integer values from 0 to M, where M is an integer, wherein the short subframe index corresponds to short subframes having a TTI of less than 1 ms.

Example 11 includes the subject matter of any of Examples 1-10, including or omitting optional elements, where each short subframe index is unique across a legacy radio frame and is uniquely identified by a short subframe index and the legacy radio frame has a duration of 10 ms.

Example 12 includes the subject matter of any of Examples 1-11, including or omitting optional elements, where M is equal to 9 plus an integer multiple of 10.

Example 13 includes the subject matter of any of Examples 1-12, including or omitting optional elements, further comprising a legacy subframe index having integer values from 0 to S, where S is an integer.

Example 14 includes the subject matter of any of Examples 1-13, including or omitting optional elements, where the S is equal to 9.

Example 15 includes the subject matter of any of Examples 1-14, including or omitting optional elements, where each short subframe index is unique across one legacy subframe, and the short subframe indices repeat for every legacy subframe while preserving the legacy subframe indices, therefore enabling the short subframe to be uniquely identified within a radio frame by the combination of a legacy subframe and a short subframe indices.

Example 16 includes the subject matter of any of Examples 1-15, including or omitting optional elements, where M is based on a number of orthogonal frequency division multiplexing (OFDM) symbols per TTI and a length of an extended cyclic-prefix (CP).

Example 17 includes the subject matter of any of Examples 1-16, including or omitting optional elements, where M is selected from a group comprising 1, 2, 3, 4, 5, 6, 9, 11, 12 and 13.

Example 18 is directed to an apparatus configured to be employed within a user equipment (UE). The apparatus includes control circuitry. The control circuitry is configured to receive an SPS configuration from an evolved Node B (eNodeB) and determine a short subframe uplink interval from the SPS configuration, wherein the short subframe uplink interval corresponds to short subframes having a TTI less than 1 ms.

Example 19 includes the subject matter of Example 18, including or omitting optional elements, where the control circuitry is configured to determine a short subframe downlink interval from the SPS configuration.

Example 20 includes the subject matter of any of Examples 18-19, including or omitting optional elements, where the control circuitry is configured to determine a legacy subframe uplink and/or downlink interval from the SPS configuration.

Example 21 includes the subject matter of any of Examples 18-20, including or omitting optional elements, where the SPS configuration includes an SPS-ConfigUL that includes an implicit release after value.

Example 22 includes the subject matter of any of Examples 18-21, including or omitting optional elements, where the control circuitry is configured to generate a physical uplink shared channel (PUSCH) according to the determined short subframe uplink interval.

Example 23 includes the subject matter of any of Examples 18-22, including or omitting optional elements, where the SPS configuration includes a short subframe index having integer values from 0 to M, where M is an integer, wherein the short subframe index corresponds to short subframes having a TTI of less than 1 ms.

Example 24 is directed to one or more computer-readable media having instructions. The instructions, when executed, cause one or more evolved Node Bs (eNodeBs) to determine short subframe uplink intervals and short subframe downlink intervals for a user equipment (UE) based at least partially on a transmit time interval (TTI), configure a semi-persistent scheduling (SPS) configuration that includes the short subframe uplink intervals and the short subframe downlink intervals and transmit the SPS configuration using radio resource control (RRC) signaling.

Example 25 includes the subject matter of any of Example 24, including or omitting optional elements, where the instructures further cause the one or more eNodeBs to configure the SPS configuration using legacy subframe indexing and short subframe indexing.

Example 26 is an apparatus configured to be employed within an evolved Node B (eNodeB). The apparatus includes a means for determining short subframe uplink intervals and short subframe downlink intervals for a user equipment (UE). The apparatus includes a means for configuring a semi-persistent scheduling (SPS) configuration that includes the short subframe uplink intervals and the short subframe downlink intervals. The apparatus also includes a means for transmitting the SPS configuration using radio resource control (RRC) signaling.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an evolved Node B (eNodeB), the apparatus comprising:
   control circuitry configured to
      configure a semi-persistent scheduling (SPS) configuration that accommodates short subframes, wherein the short subframes have a transmit time interval (TTI) of less than duration of 1 ms, wherein the SPS configuration comprises:
         a short subframe index of a short subframe having short subframe integer values from 0 to M, where M is an integer, wherein the short subframe index corresponds to short subframes having a TTI of less than 1 ms;
         and
      provide the SPS configuration within a radio resource control (RRC) signaling;
   wherein each short subframe index is unique across short subframe indices within a legacy subframe, wherein a radio frame comprises legacy subframe integer values of the legacy subframe and the short subframe integer values of the short subframe as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

2. The apparatus of claim 1, further comprising a transceiver configured to provide the SPS configuration to a user equipment (UE).

3. The apparatus of claim 1, wherein the control circuitry is configured to activate, re-activate, or release SPS by providing a command using a downlink control information (DCI), wherein the command includes one of an activation command, a reactivation command or release command.

4. The apparatus of claim 3, wherein the command can be associated with either legacy subframe durations, short subframe durations or both legacy and short subframe durations.

5. The apparatus of claim 1, wherein the control circuitry is configured to activate or re-activate SPS for both legacy subframes and short subframes concurrently.

6. The apparatus of claim 1, wherein the SPS configuration includes an uplink interval for short subframes, a downlink interval for short subframes, a legacy uplink interval for legacy subframes and a short subframe uplink interval for short subframes, wherein the legacy subframes have a duration of 1 ms.

7. The apparatus of claim 1, wherein the control circuitry is configured to generate a Medium Access Control (MAC) entity to accommodate both legacy and short subframes concurrently.

8. The apparatus of claim 1, wherein each short subframe index is unique across a legacy radio frame and is uniquely identified by a short subframe index and the legacy radio frame has a duration of 10 ms.

9. The apparatus of claim 8, wherein M is equal to 9 plus an integer multiple of 10.

10. The apparatus of claim 8, wherein the S is equal to 9.

11. The apparatus of claim 1, wherein the SPS configuration comprises:
   a legacy subframe index having long subframe integer values from 0 to S, where S is an integer, wherein short subframe values and the long subframe integer values refer to different subframe durations, respectively, within the radio frame by the SPS configuration.

12. The apparatus of claim 1, wherein M is based on a number of OFDM symbols per TTI and a length of CP.

13. The apparatus of claim 1, wherein M is selected from a group comprising 1, 2, 3, 4, 5, 6, 9, 11, 12 and 13.

14. The apparatus of claim 1, wherein the SPS configuration includes short subframes having a transmit time interval (TTI) of one or more orthogonal frequency division multiplexing (OFDM) symbols with or without an extended cyclic-prefix (CP).

15. An apparatus configured to be employed within a user equipment (UE), the apparatus comprising:
   control circuitry configured to
      receive an SPS configuration from an evolved Node B (eNodeB); and
      determine a short subframe uplink interval from the SPS configuration, wherein the short subframe uplink interval corresponds to short subframes having a TTI less than 1 ms, wherein the SPS configuration comprises:
         a short subframe index of a short subframe having short subframe integer values from 0 to M, where M is an integer, wherein the short subframe index corresponds to short subframes having a TTI of less than 1 ms;
   wherein each short subframe index is unique across short subframe indices within a legacy subframe, wherein a radio frame comprises legacy subframe integer values of the legacy subframe and the short subframe integer values of the short subframe as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

16. The apparatus of claim 15, wherein the control circuitry is configured to determine a legacy subframe uplink and/or downlink interval from the SPS configuration.

17. The apparatus of claim 15, wherein the SPS configuration includes an SPS-ConfigUL that includes an implicit release after value.

18. The apparatus of claim 15, wherein the control circuitry is configured to generate a physical uplink shared channel (PUSCH) according to the determined short subframe uplink interval.

19. One or more non-transitory computer-readable media having instructions that, when executed, cause one or more evolved Node Bs (eNodeBs) to:
determine short subframe uplink intervals and short subframe downlink intervals for a user equipment (UE) based at least partially on a transmit time interval (TTI);
configure a semi-persistent scheduling (SPS) configuration that includes the short subframe uplink intervals and the short subframe downlink intervals, wherein the SPS configuration comprises:
a short subframe index of a short subframe having short subframe integer values from 0 to M, where M is an integer, and wherein the short subframe index corresponds to short subframes having a TTI of less than 1 ms; and
transmit the SPS configuration using radio resource control (RRC) signaling;
wherein each short subframe index is unique across short subframe indices within a legacy subframe, wherein a radio frame comprises legacy subframe integer values of the legacy subframe and the short subframe integer values of the short subframe therein as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

20. An evolved Node B (eNodeB), comprising:
control circuitry configured to
configure a semi-persistent scheduling (SPS) configuration that accommodates short subframes, wherein the short subframes have a transmit time interval (TTI) of less than duration of 1 ms, wherein the SPS configuration comprises:
a short subframe index of a short subframe having short subframe integer values from 0 to M, where M is an integer, wherein the short subframe index corresponds to short subframes having a TTI of less than 1 ms; and
provide the SPS configuration within a radio resource control (RRC) signaling;

wherein each short subframe index is unique across short subframe indices within a legacy subframe, wherein a radio frame comprises legacy subframe integer values of the legacy subframe and the short subframe integer values of the short subframe as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

21. The eNodeB of claim 20, wherein the control circuitry is configured to activate, re-activate, or release SPS by providing a command using a downlink control information (DCI), wherein the command includes one of an activation command, a reactivation command or release command, and wherein the command is associated with either legacy subframe durations, short subframe durations or both legacy and short subframe durations.

22. The eNodeB of claim 20, wherein the SPS configuration includes an uplink interval for short subframes, a downlink interval for short subframes, a legacy uplink interval for legacy subframes and a short subframe uplink interval for short subframes, wherein the legacy subframes have a duration of 1 ms.

23. The eNodeB of claim 20, wherein the control circuitry is configured to generate a Medium Access Control (MAC) entity to accommodate both legacy and short subframes concurrently.

24. The eNodeB of claim 20, wherein each short subframe index is unique across a legacy radio frame and is uniquely identified by a short subframe index and the legacy radio frame has a duration of 10 ms.

25. The eNodeB of claim 20, wherein the SPS configuration comprises:
a legacy subframe index having long subframe integer values from 0 to S, where S is an integer, wherein short subframe values and the long subframe integer values refer to different subframe durations, respectively, within the radio frame by the SPS configuration.

26. A user equipment (UE), comprising:
control circuitry configured to
receive an SPS configuration from an evolved Node B (eNodeB); and
determine a short subframe uplink interval from the SPS configuration, wherein the short subframe uplink interval corresponds to short subframes having a TTI less than 1 ms, wherein the SPS configuration comprises:
a short subframe index of a short subframe having short subframe integer values from 0 to M, where M is an integer, wherein the short subframe index corresponds to short subframes having a TTI of less than 1 ms;
wherein each short subframe index is unique across short subframe indices within a legacy subframe, wherein a radio frame comprises legacy subframe integer values of the legacy subframe and the short subframe integer values of the short subframe as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

27. The UE of claim 26, wherein the SPS configuration includes an SPS-ConfigUL that includes an implicit release after value.

28. The UE of claim 26, wherein the control circuitry is configured to generate a physical uplink shared channel (PUSCH) according to the determined short subframe uplink interval.

29. A method of a user equipment (UE), comprising:
receiving an SPS configuration from an evolved Node B (eNodeB); and
determining a short subframe uplink interval from the SPS configuration, wherein the short subframe uplink interval corresponds to short subframes having a TTI less than 1 ms, wherein the SPS configuration comprises:
a short subframe index of a short subframe having short subframe integer values from 0 to M, where M is an integer, wherein the short subframe index corresponds to short subframes having a TTI of less than 1 ms;

wherein each short subframe index is unique across short subframe indices within a legacy subframe, wherein a radio frame comprises legacy subframe integer values of the legacy subframe and the short subframe integer values of the short subframe as configured by the SPS configuration, and the short subframe indices repeat from the legacy subframe to another legacy subframe while preserving legacy subframe indices to enable the short subframe to be uniquely identified within the radio frame from among the legacy subframe and the another legacy subframe, and within the legacy subframe, the radio frame comprising a combination of the legacy subframe indices and the short subframe indices.

* * * * *